(12) United States Patent
Sendoda (10) Patent No.: US 11,838,731 B2
(45) Date of Patent: Dec. 5, 2023

(54) SOUND RECOGNITION APPARATUS, SOUND RECOGNITION METHOD, AND NON-TRANSITORY COMPUTER READABLE MEDIUM STORING PROGRAM

(71) Applicant: NEC Corporation, Tokyo (JP)

(72) Inventor: Mitsuru Sendoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 265 days.

(21) Appl. No.: 17/440,336

(22) PCT Filed: Mar. 28, 2019

(86) PCT No.: PCT/JP2019/013814
§ 371 (c)(1),
(2) Date: Sep. 17, 2021

(87) PCT Pub. No.: WO2020/194717
PCT Pub. Date: Oct. 1, 2020

(65) Prior Publication Data
US 2022/0150622 A1    May 12, 2022

(51) Int. Cl.
*H04R 3/00*  (2006.01)
*H04R 1/40*  (2006.01)
(Continued)

(52) U.S. Cl.
CPC ............. *H04R 3/005* (2013.01); *H04R 1/406* (2013.01); *H04R 29/005* (2013.01); *G01H 3/08* (2013.01); *H04R 2201/401* (2013.01)

(58) Field of Classification Search
CPC ...... H04R 3/005; H04R 1/406; H04R 29/005; H04R 2201/401; G01H 3/08
(Continued)

(56) References Cited

U.S. PATENT DOCUMENTS

2002/0009203 A1* 1/2002 Erten ............... H04R 1/406
381/94.1
2002/0181721 A1 12/2002 Sugiyama et al.
(Continued)

FOREIGN PATENT DOCUMENTS

JP    2003-111183 A    4/2003
JP    2006-267444 A    10/2006
(Continued)

OTHER PUBLICATIONS

JP Office Action for JP Application No. 2021-508641, dated Dec. 20, 2022 with English Translation.
(Continued)

*Primary Examiner* — Sean H Nguyen
(74) *Attorney, Agent, or Firm* — Sughrue Mion, PLLC (57) ABSTRACT

A sound recognition apparatus (100) includes at least two microphones (1) that detect a surrounding sound, an attitude detection unit (4) that detects attitudes of the microphones (1), a self-position estimation unit (52) that estimates positions of the microphones (1) based on the attitudes of the microphones (1) and a signal of the sound detected by the microphone (1), a sound source estimation unit (53) that estimates a direction of the sound source (200) of the sound based on the attitudes of the microphones (1) and the signal of the sound detected by the microphone (1), and a sound environment mapping unit (54) that creates a sound environment map based on the positions of the microphones (1) and the direction of the sound source (200), the sound environment map displaying at least a position of the sound source (200).

12 Claims, 6 Drawing Sheets

(51) Int. Cl.
*H04R 29/00* (2006.01)
*G01H 3/08* (2006.01)

(58) Field of Classification Search
USPC .......................................................... 381/56
See application file for complete search history.

(56) References Cited

U.S. PATENT DOCUMENTS

| | | |
|---|---|---|
| 2005/0271221 A1* | 12/2005 | Cerwin .................. H04R 3/005 381/91 |
| 2006/0215854 A1 | 9/2006 | Suzuki et al. |
| 2015/0063069 A1 | 3/2015 | Nakadai et al. |
| 2015/0341735 A1 | 11/2015 | Kitazawa |
| 2018/0192186 A1* | 7/2018 | Tsingos .................. H04R 1/406 |
| 2019/0075393 A1* | 3/2019 | Nakadai ............... G10L 21/0272 |
| 2019/0335272 A1* | 10/2019 | Tsingos .................. G10L 19/20 |

FOREIGN PATENT DOCUMENTS

| | | |
|---|---|---|
| JP | 2015-50610 A | 3/2015 |
| JP | 2015-56676 A | 3/2015 |
| JP | 2015-226104 A | 12/2015 |
| JP | 2016-109971 A | 6/2016 |
| JP | 2018-042041 A | 3/2018 |
| JP | 2019-29754 A | 2/2019 |

OTHER PUBLICATIONS

International Search Report for PCT Application No. PCT/JP2019/013814, dated May 28, 2019.

\* cited by examiner

SOUND RECOGNITION APPARATUS, SOUND RECOGNITION METHOD, AND NON-TRANSITORY COMPUTER READABLE MEDIUM STORING PROGRAM

This application is a National Stage Entry of PCT/JP2019/013814 filed on Mar. 28, 2019, the contents of all of which are incorporated herein by reference, in their entirety.

TECHNICAL FIELD

The present disclosure relates to a sound recognition apparatus, a sound recognition method, and a non-transitory computer readable medium storing a program.

BACKGROUND ART

There is a need to estimate abnormalities and specific conditions of equipment used in factories, home life, general commercial facilities, and the like by a sound. A technique for detecting a specific sound from a surrounding environment in order to detect an abnormality or a situation of the equipment is known. Since various sounds are usually mixed in the surrounding environment, a noise cancellation technique (hereinafter referred to as "NC") for reducing (removing) noise included in an input signal by identifying the noise is known. There are other known methods such as a method for extracting characteristics of a sound itself, and a method for specifying a sound from characteristics of a frequency constituting the sound using a Nonnegative Matrix Factorization (NMF) or Mel-Frequency Cepstrum Coefficients (MFCC). Further, Patent Literature 1 proposes a technique for specifying the number of sound sources, a spatial existence range of the sound sources, an existence period of the sound, and the like, even for sound sources exceeding the number of microphones by signal processing using a plurality of microphones. In addition, a sound source position specifying technique using the known positional relationship between the sound source and the microphone is also commonly known.

Thus, in the sound recognition method described in Patent Literature 1 and the sound recognition method described above, the number of sound sources, the spatial existence range of the sound sources, the existence period of the sound, and a direction of arrival of the sound can be specified.

CITATION LIST

Patent Literature

Patent Literature 1: Japanese Unexamined Patent Application Publication No. 2006-267444

SUMMARY OF INVENTION

Technical Problem

However, in the sound recognition method described in Patent Literature 1 and the sound recognition method described above, since sound recognition is performed based on the positional relationship between the sound source and the microphone at the time of measurement, there is a problem that a position or a direction of the sound source in a space cannot be recognized when the position of the measurement microphone is changed. Further, in the method for extracting characteristics of a sound itself, there is a problem that similar sounds or a plurality of identical sounds cannot be identified from each other.

An object of the present disclosure is to provide a sound recognition apparatus, a sound recognition method, and a non-transitory computer readable medium storing a program which are capable of accurately identifying similar sounds or a plurality of identical sounds and accurately estimating a sound source even when a position of a microphone is changed.

Solution to Problem

A first example aspect of the present disclosure is a sound recognition apparatus including: at least two microphones configured to detect a sound in a surrounding environment; an attitude detection unit configured to detect attitudes of the microphones; a self-position estimation unit configured to estimate positions of the microphones based on the attitudes of the microphones and a signal of the sound detected by the microphone; a sound source estimation unit configured to estimate a direction of the sound source of the sound based on the attitudes of the microphones and the signal of the sound detected by the microphone; and a sound environment mapping unit configured to create a sound environment map based on the positions of the microphones estimated by the self-position estimation unit and the direction of the sound source estimated by the sound source estimation unit, the sound environment map displaying at least a position of the sound source.

A second example aspect of the present disclosure is a sound recognition method performed by a sound recognition apparatus including: at least two microphones configured to detect a sound in a surrounding environment; and an attitude detection unit configured to detect attitudes of the microphones. The sound recognition method includes: estimating positions of the microphones based on the attitudes of the microphones and a signal of the sound detected by the microphone; estimating a direction of the sound source of the sound based on the attitudes of the microphones and the signal of the sound detected by the microphone; and creating a sound environment map based on the estimated positions of the microphones and the estimated direction of the sound source, the sound environment map displaying at least a position of the sound source.

A third example aspect of the present disclosure is a non-transitory computer readable medium storing a program for causing a sound recognition apparatus to execute: processing of estimating positions of microphones based on attitudes of the microphones detected by an attitude detection unit and a signal of a sound in a surrounding environment detected by the microphone; processing of estimating a direction of a sound source of the sound based on the attitudes of the microphones and the signal of the sound detected by the microphone; and processing of creating a sound environment map based on the estimated positions of the microphones and the estimated direction of the sound source, the sound environment map displaying at least a position of the sound source.

Advantageous Effects of Invention

It is possible to provide a sound recognition apparatus, a sound recognition method, and a non-transitory computer readable medium storing a program which are capable of accurately identifying similar sounds or a plurality of identical sounds and accurately estimating a sound source even when a position of a microphone is changed.

DESCRIPTION OF EMBODIMENTS

First Example Embodiment

Example embodiments of the present disclosure will be described below with reference to the drawings.

Figure 1:
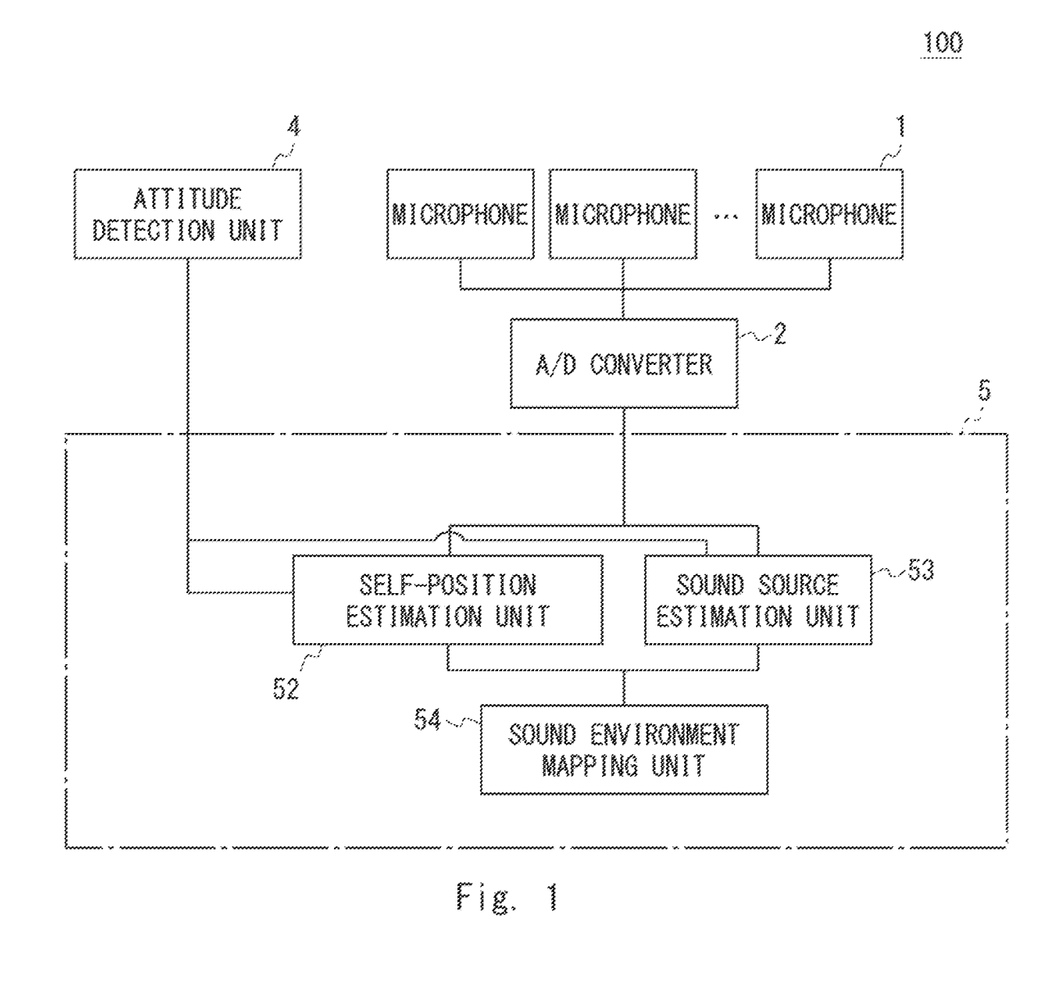
FIG. 1 is a block diagram showing an example of a configuration of a sound recognition apparatus according to a first example embodiment of the present disclosure.

FIG. 1 is a block diagram showing an example of a configuration of a sound recognition apparatus 100 according to a first example embodiment of the present disclosure. As shown in FIG. 1, the sound recognition apparatus 100 includes at least two microphones 1, an analog/digital converter (hereinafter referred to as an A/D converter) 2, an attitude detection unit 4, and a signal processing unit 5.

The signal processing unit 5 includes a self-position estimation unit 52, a sound source estimation unit 53, a sound environment mapping unit 54, and so on.

The signal processing unit 5 includes a CPU (Central Processing Unit) not shown, a storage unit not shown, and so on, and controls each unit of the signal processing unit 5. Then, the CPU executes a program stored in the storage unit, thereby implementing all the processing in the signal processing unit 5. More specifically, the CPU executes the program stored in the storage unit, thereby implementing, for example, the processing in the self-position estimation unit 52, the sound source estimation unit 53, and the sound environment mapping unit 54.

The program stored in the storage unit of the signal processing unit 5 includes codes for implementing processing in each of the signal processing unit 5 by being executed by the CPU. The storage unit includes, for example, a predetermined storage apparatus capable of storing the program and various kinds of information used for processing in the signal processing unit 5. The storage apparatus is, for example, a memory or the like.

The microphones 1 detect sounds of the surrounding environment and convert them into electric signals (analog signals).

The A/D converter 2 converts the analog signal of the sounds detected by the microphones 1 into digital signals. The A/D converter 2 inputs the digital signal to the signal processing unit 5.

The attitude detection unit 4 is included in the microphone 1 and detects an attitude of the microphone 1. The attitude detection unit 4 inputs the detected attitude information of the microphone 1 to the signal processing unit 5.

The self-position estimation unit 52 estimates the positions of the microphones 1 based on the digital signal of the sound detected by the microphones 1 and attitude information of the microphones 1 input from the attitude detection unit 4. The self-position estimation unit 52 inputs estimated position information of the microphones 1 (hereinafter, the position information will be referred to as "estimated position information of the microphones 1") to the sound environment mapping unit 54.

The sound source estimation unit 53 estimates a direction (a direction of arrival of the sound) of a sound source 200 (see FIGS. 3 and 4) based on the digital signal of the sound detected by the microphone 1 and attitude information of the microphones 1 input from the attitude detection unit 4. Then, the sound source estimation unit 53 inputs the information about the estimated direction of the sound source 200 (the direction of arrival of the sound) (hereinafter, this information will be referred to as "estimated direction information of the sound source 200") to the sound environment mapping unit 54.

More specifically, when the sounds of the sound source 200 are detected by the two microphones 1, the sound source estimation unit 53 can estimate the direction (the direction of arrival of the sound) of the sound source 200 based on the digital signals of the sounds detected by the two microphones 1 and the attitude information of the microphones 1 input from the attitude detection unit 4.

The sound environment mapping unit 54 creates a sound environment map based on the estimated position information of the microphones 1 input from the self-position estimation unit 52 and the estimated direction information of the sound source 200 input from the sound source estimation unit 53. Here, the sound environment map is a map in which at least the position of the sound source 200 is displayed.

When the sound source 200 is fixed in the surrounding environment, a position of the sound source 200 in a space can be estimated based on the positions of the microphones 1 estimated by the self-position estimation unit 52 and a change in the direction (the direction of arrival of the sound) of the sound source 200 estimated by the sound source estimation unit 53 caused by changing at least one of the positions and attitudes of the two microphones 1. That is, the sound source estimation unit 53 estimates the direction of the sound source 200 (the direction of arrival of the sound) while changing at least one of the positions and attitudes of the two microphones 1, whereby the sound environment mapping unit 54 can create a two-dimensional or three-dimensional sound environment map.

In the sound recognition apparatus 100 according to the example embodiment described above, the attitudes of the microphones 1 are detected by the attitude detection unit 4. Therefore, the self-position estimation unit 52 can estimate the positions of the microphones 1 based on the digital signal of the sound detected by the microphone 1 and the attitude information of the microphones 1 detected by the attitude detection unit 4. Based on the digital signal of the sound detected by the microphone 1 and the attitude information of the microphones 1 detected by the attitude detection unit 4, the sound source estimation unit 53 can estimate the direction (the direction of arrival of the sound) of the sound source 200. Further, the sound environment mapping unit 54 creates the sound environment map in which the position of the sound source 200 is displayed.

It is thus possible to estimate which sound source 200 in the sound environment map has emitted a sound based on the sound environment map, the positions of the microphones 1 newly estimated by the self-position estimation unit 52, and the direction (the direction of arrival of the sound) of the sound source 200 newly estimated by the sound source estimation unit 53.

In this manner, for example, even when there are a plurality of sound sources 200 emitting similar sounds or identical sounds in the surrounding environment, it is possible to identify which sound source 200 has emitted the sounds.

Even when the position of the microphone 1 is changed, the sound source 200 which has emitted the sound can be accurately estimated.

Therefore, according to the sound recognition apparatus 100 of the first example embodiment, similar sounds or identical sounds can be accurately identified from each other, and a sound source can be accurately estimated even when a position of a microphone is changed.

Second Example Embodiment

Next, a sound recognition apparatus 100A according to a second example embodiment of the present disclosure will be described.

Figure 2:
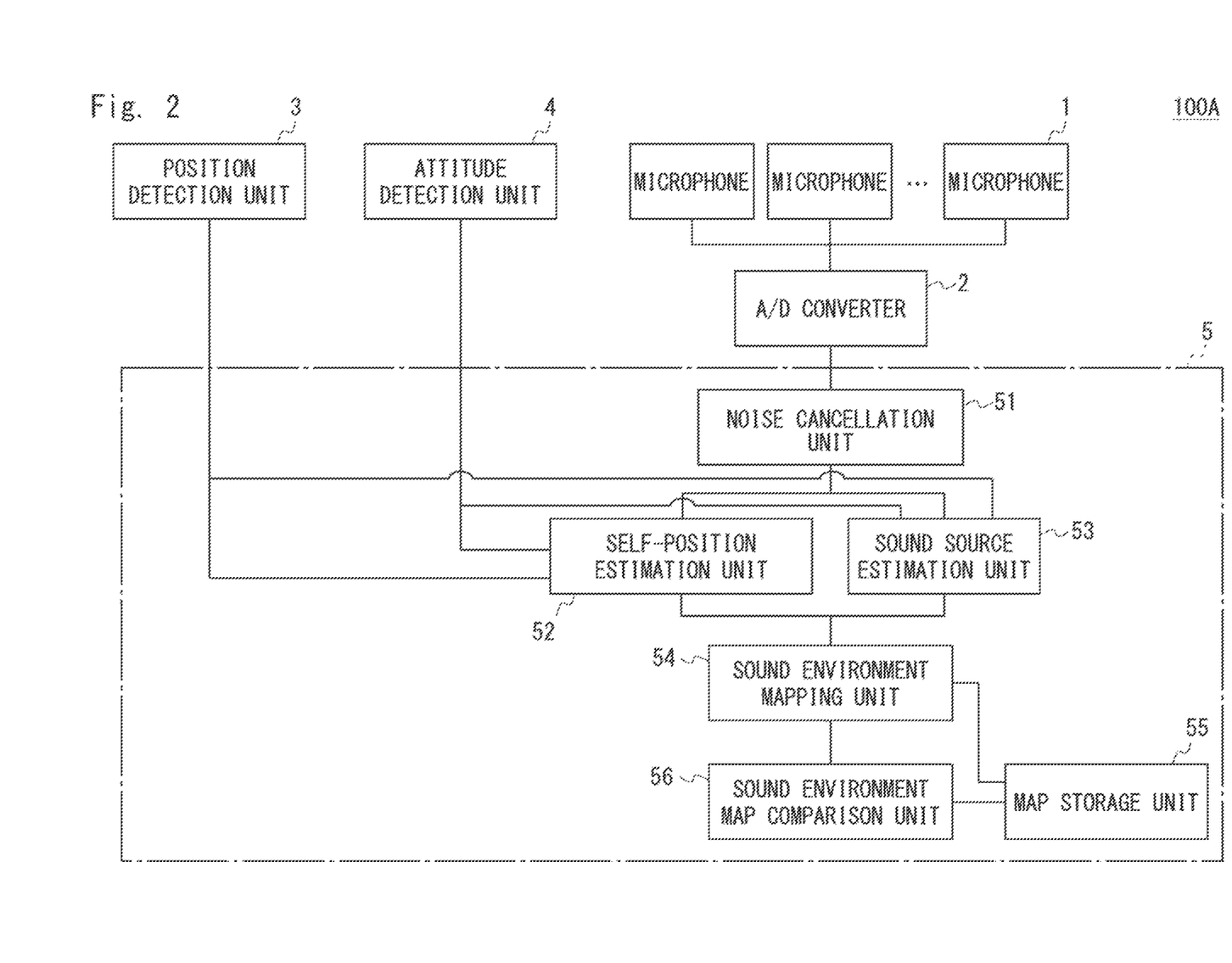
FIG. 2 is a block diagram showing an example of a configuration of a sound recognition apparatus according to a second example embodiment of the present disclosure.

FIG. 2 is a block diagram showing an example of a configuration of the sound recognition apparatus 100A according to the second example embodiment of the present disclosure. As shown in FIG. 2, the sound recognition apparatus 100A includes at least two microphones 1, an analog-to-digital converter (hereinafter referred to as an A/D converter) 2, a position detection unit 3, an attitude detection unit 4, and a signal processing unit 5.

The microphone 1 detects the sound of the surrounding environment and converts it into an electric signal (an analog signal). A plurality of the microphones 1 may be included in the sound recognition apparatus 100A. When the sound recognition apparatus 100A includes the plurality of microphones 1, a relative positional relation between the plurality of microphones 1 is constant. When the relative positional relation between the plurality of microphones 1 is constant, the attitude detection unit 4 for detecting the attitudes of the microphones 1 may be included in one of the plurality of microphones 1 designated in advance.

The A/D converter 2 converts an analog signal of the sound detected by the microphone 1 into a digital signal. The A/D converter 2 inputs the digital signal to the signal processing unit 5.

The position detection unit 3 is disposed in a fixed positional relationship with the microphones 1 and detects a self-position of the position detection unit 3. When the sound recognition apparatus 100A includes the plurality of microphones 1, the position detection unit 3 may be provided in each of the plurality of microphones 1. However, when the relative positional relationship between the plurality of microphones 1 is constant, the position detection unit 3 may be included with a constant positional relationship with one of the plurality of microphones 1. Then, the position detection unit 3 inputs the position information relating to the detected self-position to the signal processing unit 5.

The position detection unit 3 is, for example, a GPS receiver or the like including a function of receiving radio waves from a GPS satellite, and detects the self-position of the position detection unit 3. The position detection unit 3 may be a GPS receiver for indoor environments.

Further, the position detection unit 3 may include a wireless communication function such as Wi-Fi (registered trademark), and detect the self-position of the position detection unit 3 by communication with the access point.

The position detection unit 3 is a receiver that receives BLE (Bluetooth (registered trademark) Low Energy) signals from a beacon transmitter, and may detect the self-position based on received signal strength or the like.

The position detection unit 3 is an RFID (Radio Frequency Identifier) tag, and may detect the self-position by communicating with an RFID tag reader.

The position detection unit 3 may be anything long as it has a function of detecting the self-position.

The attitude detection unit 4 is included in the microphone 1 and detects the attitudes of the microphones 1. When the sound recognition apparatus 100A includes the plurality of microphones 1, the attitude detection unit 4 may be included in each of the plurality of microphones 1. However, when the relative positional relationship between the plurality of microphones 1 is constant, the attitude detection unit 4 may be provided in one of the plurality of microphones 1 designated in advance. The attitude detection unit 4 inputs the detected attitude information of the microphones 1 to the signal processing unit 5.

The attitude detection unit 4 is, for example, a gyro sensor, a magnetic sensor, or the like, and may be anything as long as it has a function of detecting the attitudes of the microphones 1.

The signal processing unit 5 includes a noise cancellation unit 51, a self-position estimation unit 52, a sound source estimation unit 53, a sound environment mapping unit 54, a map storage unit 55, a sound environment map comparison unit 56, and so on.

The signal processing unit 5 includes a CPU (Central Processing Unit) not shown, a storage unit not shown, and so on, and controls each unit of the signal processing unit 5. Then, the CPU executes a program stored in the storage unit, thereby implementing all the processing in the signal processing unit 5. More specifically, the CPU executes the program stored in the storage unit, thereby implementing, for example, the processing in the noise cancellation unit 51, the self-position estimation unit 52, the sound source estimation unit 53, the sound environment mapping unit 54, the map storage unit 55, and the sound environment map comparison unit 56.

The program stored in the storage unit of the signal processing unit 5 includes codes for implementing processing in each of the signal processing unit 5 by being executed by the CPU. The storage unit includes, for example, a predetermined storage apparatus capable of storing the program and various kinds of information used for processing in the signal processing unit 5. The storage apparatus is, for example, a memory or the like.

The noise cancellation unit 51 cancels noise other than the target sound in the digital signal input from the A/D converter 2. The noise cancellation unit 51 inputs the digital signal from which noise has been canceled to the self-position estimation unit 52 and the sound source estimation unit 53.

The self-position estimation unit 52 estimates the positions of the microphones 1 based on the digital signal of the sound input from the noise cancellation unit 51, the position information input from the position detection unit 3 (the position information relating to the self-position of the position detection unit 3), a positional relation between the position detection unit 3 and the microphones 1, and attitude information (attitude information of the microphones 1)

input from the attitude detection unit 4. Note that the position information input from the position detection unit 3 and the positional relationship between the position detection unit 3 and the microphone 1 are not essential for estimating the positions of the microphones 1 in the self-position estimation unit 52. The self-position estimation unit 52 inputs estimated position information of the microphones 1 (hereinafter, the position information will be referred to as "estimated position information of the microphones 1") to the sound environment mapping unit 54.

The sound source estimation unit 53 estimates a direction (an direction of arrival of a sound) of the sound source 200 (see FIGS. 3 and 4) based on a digital signal of the sound input from the noise cancellation unit 51, position information input from the position detection unit 3 (the position information relating to the self-position of the position detection unit 3), the positional relation between the position detection unit 3 and the microphones 1, and the attitude information (the attitude information of the microphones 1) input from the attitude detection unit 4. Note that the position information input from the position detection unit 3 and the positional relationship between the position detection unit 3 and the microphones 1 are not essential for estimating the direction (the direction of arrival of the sound) of the sound source 200 in the sound source estimation unit 53.

Furthermore, the sound source estimation unit 53 extracts a feature amount from the digital signal of the sound input from the noise cancellation unit 51, and specifies a type of the sound source 200 (a type of the sound (such as a wavelength) based on the feature amount. Here, the feature amount includes a waveform, a phase, a frequency component, and the like. Then, the sound source estimation unit 53 inputs the information about the estimated direction of the sound source 200 (the direction of arrival of the sound) (hereinafter, this information will be referred to as "estimated direction information of the sound source 200") and specifying information of the sound source 200 to the sound environment mapping unit 54.

The sound environment mapping unit 54 creates a sound environment map based on the estimated position information of the microphones 1 input from the self-position estimation unit 52, the estimated direction information of the sound source 200 input from the sound source estimation unit 53, and the specifying information of the sound source 200. The sound environment map is, for example, a map in which the position of the sound source 200 and the type of the sound source 200 (a type of the sound (such as a wavelength) are displayed. Then, the sound environment mapping unit 54 stores the created sound environment map in the map storage unit 55. The sound environment mapping unit 54 inputs the created sound environment map to the sound environment map comparison unit 56.

The map storage unit 55 stores the sound environment map input from the sound environment mapping unit 54. Specifically, the map storage unit 55 stores a previously created sound environment map (hereinafter, the previously created sound environment map is referred to as a reference sound environment map), and further stores the newly created sound environment map separately from the reference sound environment map.

The sound environment map comparison unit 56 compares the sound environment map input from the sound environment mapping unit 54 with the reference sound environment map previously stored in the map storage unit 55. By doing so, the sound environment map comparison unit 56 detects a movement of the position of the sound source 200 and a change in the type of the sound source 200. Further, by assuming that the types of the sound sources 200 located at the same positions are the same sound sources 200, the sound environment map comparison unit 56 detects changes in the sounds of the sound sources 200.

When the sound of the sound source 200 is detected by the two microphones 1, the sound source estimation unit 53 can estimate the direction (the direction of arrival of the sound) of the sound source 200. When the sound source 200 is fixed in the surrounding environment, a (two- or three-dimensional) position of the sound source 200 in a space can be estimated based on the positions of the microphones 1 estimated by the self-position estimation unit 52 and a change in the direction (the direction of arrival of the sound) of the sound source 200 estimated by the sound source estimation unit 53 caused by changing at least one of the positions and attitudes of the two microphones 1.

When the sound of the sound source 200 is detected by three microphones 1, the sound source estimation unit 53 can estimate the (two-dimensional) position of the sound source 200 in a plane without changing the positions of the microphones 1.

Furthermore, when the sound of the sound source 200 is detected by four microphones 1, the sound source estimation unit 53 can estimate the (three-dimensional) position of the sound source 200 in the space without changing the positions of the microphones 1.

That is, the sound source estimation unit 53 estimates the direction of the sound source 200 (the direction of arrival of the sound) while changing at least one of the positions and attitudes of the two microphones 1, whereby the sound environment mapping unit 54 can create a two-dimensional or three-dimensional sound environment map.

When the sound of the sound source 200 is detected by three microphones 1, the sound environment mapping unit 54 can create the two-dimensional sound environment map without changing the positions of the microphones 1.

When the sound of the sound source 200 is detected by four microphones 1, the sound environment mapping unit 54 can create the three-dimensional sound environment map without changing the positions of the microphones 1.

Figure 3:
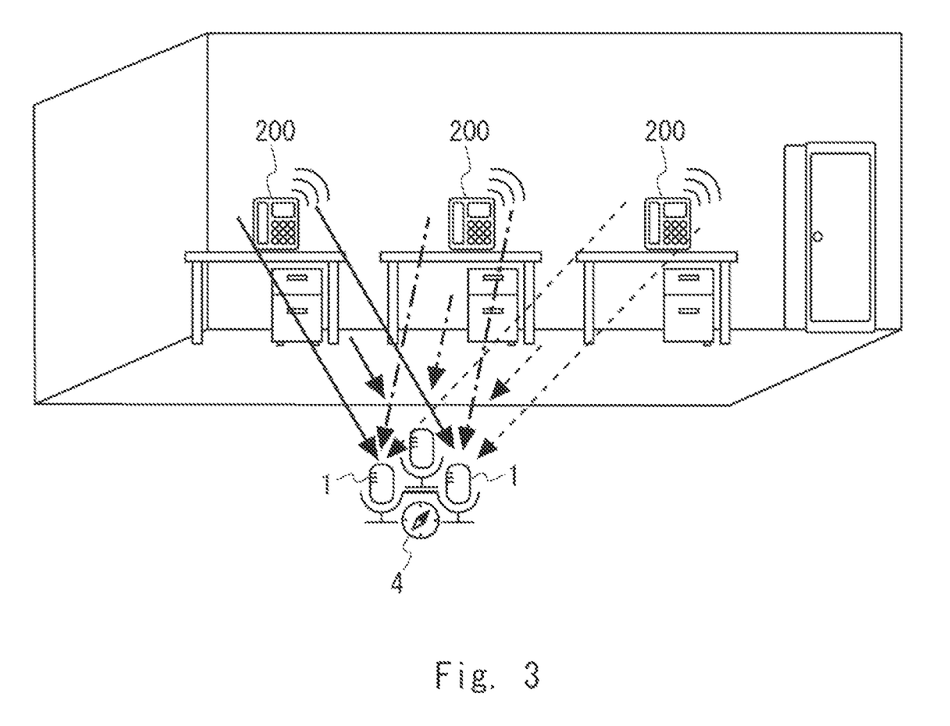
FIG. 3 is a diagram for explaining an example of a sound recognition method according to the second example embodiment of the present disclosure.
Figure 4:
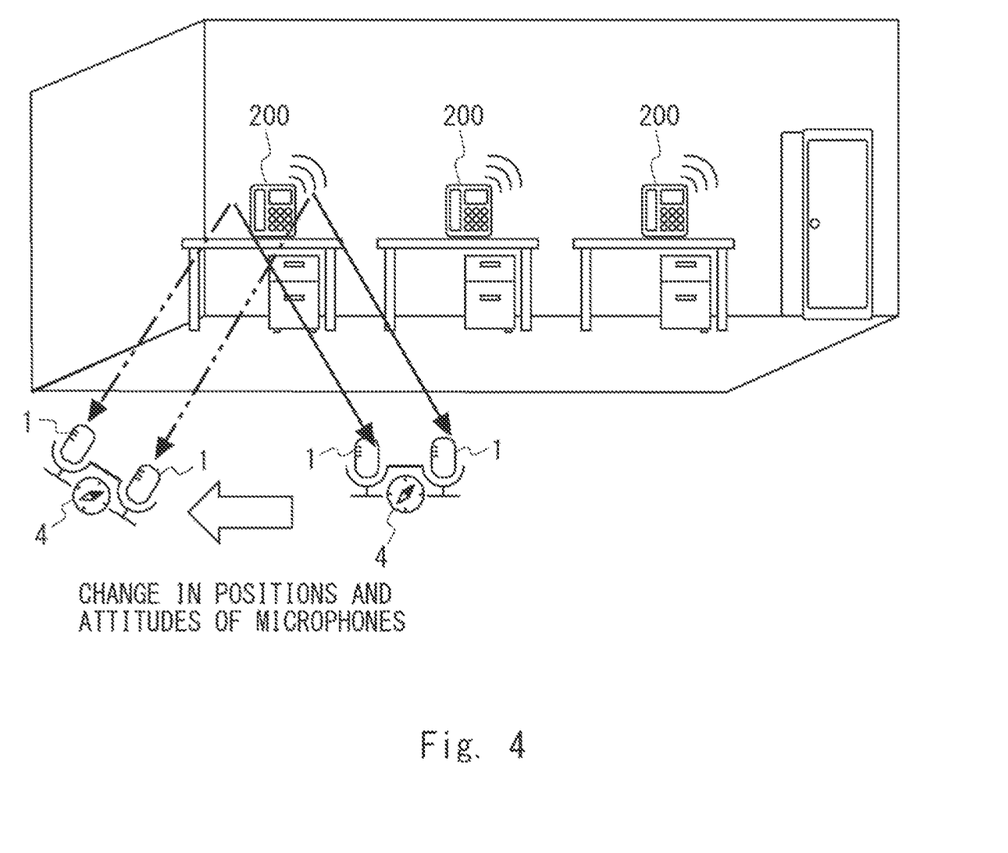
FIG. 4 is a diagram for explaining an example of the sound recognition method according to the second example embodiment of the present disclosure.

For example, as shown in FIG. 3, when the sound of the sound source 200 is detected by three or more microphones 1 with fixed attitudes and positions, the sound environment mapping unit 54 can prepare the two-dimensional reference sound environment map in advance. Thus, as shown in FIG. 4, if there are only two microphones 1, even when the attitudes and positions of the microphones 1 are changed, the signal processing unit 5 can estimate the position of the sound source 200 in the plane based on the direction (the direction of arrival of the sound) of the sound source 200 estimated by the sound source estimation unit 53 and the reference sound environment map.

Similarly, when the sound of the sound source 200 is detected by four or more microphones 1 with fixed attitudes and positions, the sound environment mapping unit 54 can prepare the three-dimensional reference sound environment map in advance. Thus, if there are only two microphones 1, even when the attitudes and positions of the microphones 1 are changed, the signal processing unit 5 can estimate the position of the sound source 200 in the space based on the direction (the direction of arrival of the sound) of the sound source 200 estimated by the sound source estimation unit 53 and the reference sound environment map.

Figure 5:
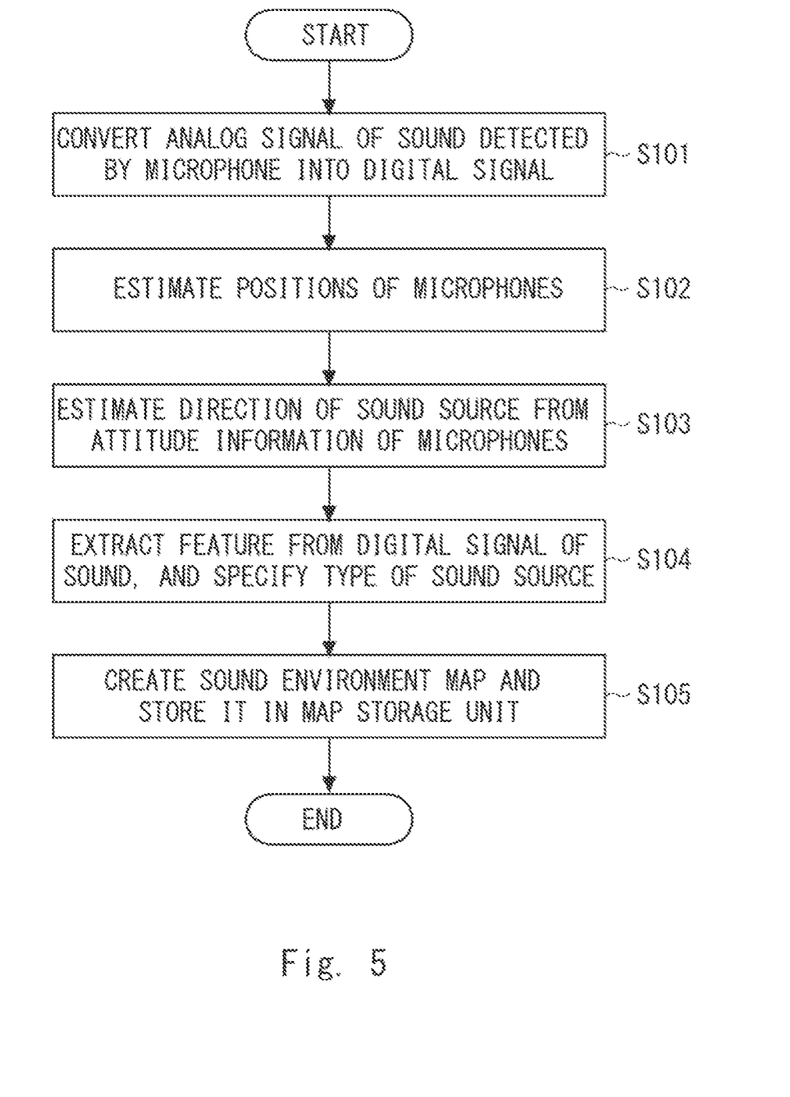
FIG. 5 is a flowchart showing an example of a method for creating a reference sound environment map in the sound recognition method according to the second example embodiment of the present disclosure.
Figure 6:
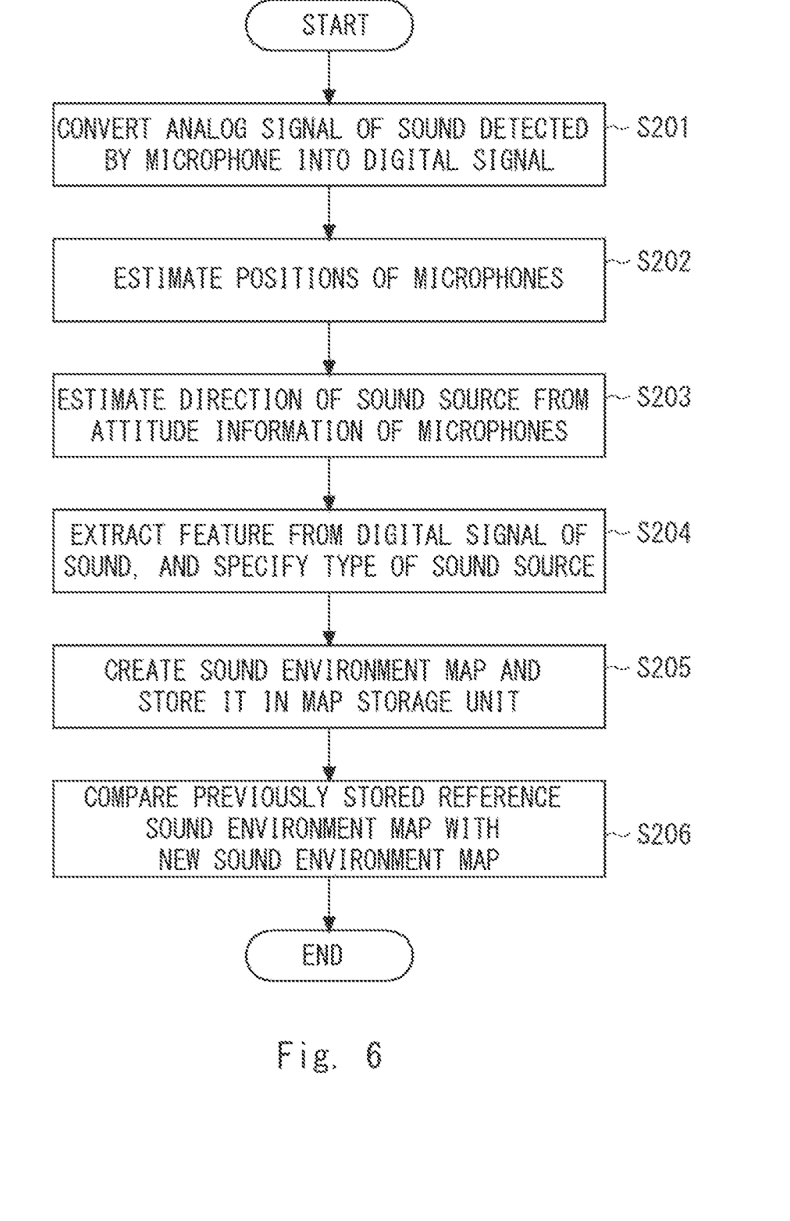
FIG. 6 is a flowchart showing an example of the sound recognition method according to the second example embodiment of the present disclosure.

Next, a sound recognition method according to the second example embodiment will be described with reference to FIGS. 5 and 6. FIG. 5 is a flowchart showing an example of a method for creating the reference sound environment map in the sound recognition method. FIG. 6 is a flowchart showing an example of the sound recognition method using the reference sound environment map created in FIG. 5.

First, as shown in FIG. 5, the signal processing unit 5 creates the reference sound environment map. As described above, when the attitudes and positions of the microphones 1 are fixed to the predetermined attitudes and positions, the sound environment mapping unit 54 can create the two-dimensional sound environment map if the sound of the sound source 200 is detected using the three microphones 1. When the attitudes and positions of the microphones 1 are fixed to predetermined attitudes and positions, the sound environment mapping unit 54 can create the three-dimensional sound environment map if the sound of the sound source 200 is detected using four microphones 1. When at least one of the attitudes and positions of the microphones 1 are changed, the sound environment mapping unit 54 can create the two-dimensional or three-dimensional sound environment map if the sound of the sound source 200 is detected using the two microphones 1.

As shown in FIG. 5, first, the analog signal of the sound detected by the microphone 1 is converted into the digital signal by the A/D converter 2 (Step S101). Then, the digital signal is input from the A/D converter 2 to the noise cancellation unit 51, and the noise is canceled from the digital signal of the sound by the noise cancellation unit 51.

Next, the self-position estimation unit 52 estimates the positions of the microphones 1 (Step S102). Specifically, the self-position estimation unit 52 estimates the positions of the microphones 1 based on the digital signal of the sound input from the noise cancellation unit 51, the position information relating to the self-position of the position detection unit 3, the positional relationship between the position detection unit 3 and the microphones 1, and the attitude information of the microphones 1 input from the attitude detection unit 4. The self-position estimation unit 52 inputs the estimated position information of the microphones 1 to the sound environment mapping unit 54.

The sound source estimation unit 53 estimates the direction of the sound source 200 (the direction of arrival of the sound) (Step S103). Specifically, the sound source estimation unit 53 estimates the direction of the sound source 200 (the direction of arrival of the sound) based on the digital signal of the sound input from the noise cancellation unit 51, the position information relating to the self-position of the position detection unit 3, the positional relationship between the position detection unit 3 and the microphones 1, and the attitude information of the microphones 1 input from the attitude detection unit 4.

The sound source estimation unit 53 specifies the type of the sound source 200 (the type of sound (wavelength, etc.)) (Step S104). Specifically, the sound source estimation unit 53 extracts a feature amount from the digital signal of the sound input from the noise cancellation unit 51, and specifies the sound source 200 based on the feature amount. Then, the sound source estimation unit 53 inputs, together with the estimated direction information of the sound source 200 estimated in Step S103, the specific information of the sound source 200 to the sound environment mapping unit 54.

Next, the sound environment mapping unit 54 creates the reference sound environment map and stores the reference sound environment map in the map storage unit 55 (Step S105). Specifically, the sound environment mapping unit 54 creates the sound environment map based on the estimated position information of the microphones 1 input from the self-position estimation unit 52, the estimated direction information of the sound source 200 input from the sound source estimation unit 53, and the specifying information of the sound source 200.

Note that it is not necessary that the processes in Steps S102, S103, and S104 are executed in the above order, and the processes in Steps S102, S103, and S104 may be executed simultaneously and in parallel.

As described above, when sound recognition is performed using the reference sound environment map, even if the attitude and position of the microphone 1 is changed, the signal processing unit 5 can estimate the position of the sound source 200 in a plane (two-dimensional position) or space (three-dimensional position). Specifically, the signal processing unit 5 can estimate the position of the sound source 200 in a plane or a space based on the reference sound environment map, the direction of the sound source 200 estimated using at least two microphones 1 (the direction of arrival of the sound), and the positions of the microphones 1.

More specifically, the signal processing unit 5 can estimate the position of the sound source 200 based on the reference sound environment map stored in the map storage unit 55, the direction of the sound source 200 estimated by the sound source estimation unit 53 (the direction of arrival of the sound), and the positions of the microphones 1 newly estimated by the self-position estimation unit 52.

In the sound recognition method shown in FIG. 6, a sound environment map is newly created by the sound environment mapping unit 54, and the sound environment map comparison unit 56 compares the new sound environment map with the reference sound environment map. Note that the processes in Steps S201 to S205 shown in FIG. 6 are the same as the processes in Steps S101 to S105 shown in FIG. 5, respectively, and therefore the description thereof is omitted.

First, the sound environment map comparison unit 56 compares the sound environment map input from the sound environment mapping unit 54 with the reference sound environment map previously stored in the map storage unit 55 (Step S206).

Thus, even when the sound sources 200 emitting similar sounds or identical sounds are located at a plurality of different positions, the sound environment map comparison unit 56 can detect which sound source 200 is emitting the sounds. For example, as shown in FIG. 4, even when the same ringing sounds are emitted from a plurality of the sound sources 200 such as telephones in the same room, the sound environment map comparison unit 56 can detect which sound source 200 is emitting the sounds. It is also possible to distinguish between a voice emitted from a television in a house and a conversation of a resident.

The sound environment map comparison unit 56 compares the sound environment map input from the sound environment mapping unit 54 with the reference sound environment map, thereby accurately estimating the sound source 200 which has emitted the sound even when the position of the microphone 1 is changed. Therefore, even when the sound recognition apparatus 100A is mounted on a robot and the robot performs sound recognition while moving in a factory or a facility, the position or the like of the sound source 200 can be accurately specified.

The sound environment map comparison unit 56 can detect the movement of the position of the sound source 200 and the change in the type of the sound source 200.

Further, by assuming that the types of the sound sources 200 located at the same positions are the same sound sources 200, the sound environment map comparison unit 56 can detect changes in the sounds of the sound sources 200.

Specifically, for example, when the sound sources 200 located at the same position in the sound environment map do not change, the sound environment map comparison unit 56 detects a change in the sound of the sound source 200, whereby the sound environment mapping unit 54 can create a sound situation map in which the change in the sound of the sound source 200 is mapped.

According to the sound recognition apparatus 100A, the sound recognition method, and the non-transitory computer readable medium storing the program of the second example embodiment described above, the same effects as those of the sound recognition apparatus 100 according to the first example embodiment can be obtained.

When the sound of the sound source 200 is detected by the two microphones 1, the sound source estimation unit 53 can estimate the direction (the direction of arrival of the sound) of the sound source 200. When the sound source 200 is fixed in the surrounding environment, a (two- or three-dimensional) position of the sound source 200 in a space can be estimated based on the positions of the microphones 1 estimated by the self-position estimation unit 52 and a change in the direction (the direction of arrival of the sound) of the sound source 200 estimated by the sound source estimation unit 53 caused by changing at least one of the positions and attitudes of the two microphones 1.

When the sound of the sound source 200 is detected by three microphones 1, the sound source estimation unit 53 can estimate the (two-dimensional) position of the sound source 200 in a plane without changing the positions of the microphones 1.

Furthermore, when the sound of the sound source 200 is detected by four microphones 1, the sound source estimation unit 53 can estimate the (three-dimensional) position of the sound source 200 in the space without changing the positions of the microphones 1.

That is, the sound source estimation unit 53 estimates the direction of the sound source 200 (the direction of arrival of the sound) while changing at least one of the positions and attitudes of the two microphones 1, whereby the sound environment mapping unit 54 can create a two-dimensional or three-dimensional sound environment map.

When the sound of the sound source 200 is detected by three microphones 1, the sound environment mapping unit 54 can create the two-dimensional sound environment map without changing the positions of the microphones 1.

When the sound of the sound source 200 is detected by four microphones 1, the sound environment mapping unit 54 can create the three-dimensional sound environment map without changing the positions of the microphones 1.

Then, by preparing the two-dimensional sound environment map or the three-dimensional sound environment map in advance, the signal processing unit 5 can estimate the position of the sound source 200 in a plane or a space based on the direction of the sound source 200 (the direction of arrival of the sound) estimated by the sound source estimation unit 53 and the reference sound environment map.

The self-position estimation unit 52 estimates the positions of the microphones 1 using not only the digital signal of the sound and the attitude information of the microphones 1 but also the position information relating to the self-position of the position detection unit 3 detected by the position detection unit 3 and the positional relationship between the position detection unit 3 and the microphones 1. By doing so, the positions of the microphones 1 can be estimated more accurately.

The sound source estimation unit 53 estimates the direction of the sound source 200 (the direction of arrival of the sound) by using not only the digital signal of the sound and the attitude information of the microphones 1 but also the position information relating to the self-position of the position detection unit 3 detected by the position detection unit 3 and the positional relationship between the position detection unit 3 and the microphones 1. By doing so, the direction of the sound source 200 (the direction of arrival of the sound) can be estimated more accurately.

The sound environment map comparison unit 56 compares the sound environment map input from the sound environment mapping unit 54 with the reference sound environment map, thereby detecting which sound source 200 has emitted the sound even when the sound sources 200 located at different positions emit similar or identical sounds.

The sound environment map comparison unit 56 compares the sound environment map input from the sound environment mapping unit 54 with the reference sound environment map, thereby accurately estimating the sound source 200 which has emitted the sound even when the position of the microphone 1 is changed.

The sound environment map comparison unit 56 compares the sound environment map input from the sound environment mapping unit 54 with the reference sound environment map, thereby detecting the movement of the position of the sound source 200 and the change in the type of the sound source 200.

Further, by assuming that the types of the sound sources 200 at the same positions are the same sound sources 200, the sound environment map comparison unit 56 can detect changes in the sounds of the sound sources 200. By doing so, the sound environment mapping unit 54 can create a sound situation map in which the changes in the sounds of the sound source 200 are mapped.

Further, the sound source estimation unit 53 specifies the type of the sound source 200 based on the feature amount of the digital signal of the sound detected by the microphone 1, thereby accurately detecting the change in the direction of the sound source 200 (the direction of arrival of the sound) and the change in the type of the sound source 200.

In the above example embodiments, the present disclosure has been described as a hardware configuration, but the present disclosure is not limited to this. In the present disclosure, the processing procedure described in the flowcharts of FIGS. 5 and 6 can also be implemented by causing the CPU (Central Processing Unit) to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as Mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A sound recognition apparatus comprising:

at least two microphones configured to detect a sound in a surrounding environment;

an attitude detection unit configured to detect attitudes of the microphones;

a self-position estimation unit configured to estimate positions of the microphones based on the attitudes of the microphones and a signal of the sound detected by the microphone;

a sound source estimation unit configured to estimate a direction of the sound source of the sound based on the attitudes of the microphones and the signal of the sound detected by the microphone; and a sound environment mapping unit configured to create a sound environment map based on the positions of the microphones estimated by the self-position estimation unit and the direction of the sound source estimated by the sound source estimation unit, the sound environment map displaying at least a position of the sound source.

(Supplementary Note 2)

The sound recognition apparatus according to Supplementary note 1, further comprising:

a position detection unit configured to detect the positions of the microphones, wherein the self-position estimation unit is configured to estimate the positions of the microphones based on the positions of the microphones, the attitudes of the microphones, and the signal of the sound detected by the microphone, and the sound source estimation unit is configured to estimate the direction of the sound source based on the positions of the microphones, the attitudes of the microphones, and the signal of the sound detected by the microphone.

(Supplementary Note 3)

The sound recognition apparatus according to Supplementary note 1 or 2, further comprising:

a map storage unit configured to store the sound environment map created by the sound environment mapping unit; and a sound environment map comparison unit configured to compare the sound environment map stored in the map storage unit with the sound environment map newly created by the sound environment mapping unit.

(Supplementary Note 4)

The sound recognition apparatus according to any one of Supplementary notes 1 to 3, wherein the sound source estimation unit is configured to specify a type of the sound source based on a feature amount of the signal of the sound detected by the microphone.

(Supplementary Note 5)

A sound recognition method performed by a sound recognition apparatus comprising at least two microphones configured to detect a sound in a surrounding environment, and an attitude detection unit configured to detect attitudes of the microphones, the sound recognition method comprising:

estimating positions of the microphones based on the attitudes of the microphones and a signal of the sound detected by the microphone;

estimating a direction of the sound source of the sound based on the attitudes of the microphones and the signal of the sound detected by the microphone; and creating a sound environment map based on the estimated positions of the microphones and the estimated direction of the sound source, the sound environment map displaying at least a position of the sound source.

(Supplementary Note 6)

The sound recognition method according to Supplementary note 5, wherein the sound recognition apparatus further comprises a position detection unit configured to detect the positions of the microphones, the sound recognition apparatus is configured to estimate the positions of the microphones based on the positions of the microphones, the attitudes of the microphones, and the signal of the sound detected by the microphone, and the sound recognition apparatus is configured to estimate the direction of the sound source based on the positions of the microphones, the attitudes of the microphones, and the signal of the sound detected by the microphone.

(Supplementary Note 7)

The sound recognition method according to Supplementary note 5 or 6, wherein the sound recognition apparatus is configured to store the sound environment map in a map storage unit, and the sound recognition apparatus is configured to compare the sound environment map stored in the map storage unit with the newly created sound environment map.

(Supplementary Note 8)

The sound recognition method according to any one of Supplementary notes 5 to 7, wherein the sound source recognition apparatus is configured to specify a type of the sound source based on a feature amount of the signal of the sound detected by the microphone.

(Supplementary Note 9)

A non-transitory computer readable medium storing a program for causing a sound recognition apparatus to execute:

processing of estimating positions of microphones based on attitudes of the microphones detected by an attitude detection unit and a signal of a sound in a surrounding environment detected by the microphone;

processing of estimating a direction of a sound source of the sound based on the attitudes of the microphones and the signal of the sound detected by the microphone; and processing of creating a sound environment map based on the estimated positions of the microphones and the estimated direction of the sound source, the sound environment map displaying at least a position of the sound source.

(Supplementary Note 10)

A non-transitory computer readable medium storing the program according to Supplementary note 9, further causing the sound recognition apparatus to execute:

processing of estimating the positions of the microphones based on the positions of the microphone detected by a position detection unit, attitudes of the microphones, and the signal of the sound detected by the microphone; and processing of estimating the direction of the sound source based on the positions of the microphones, the attitudes of the microphones, and the signal of the sound detected by the microphone.

(Supplementary Note 11)

A non-transitory computer readable medium storing the program according to Supplementary note 9 or 10, further causing the sound recognition apparatus to execute:

processing of storing the sound environment map in a map storage unit; and processing of comparing the sound environment map stored in the map storage unit with the newly created sound environment map.

(Supplementary Note 12)

A non-transitory computer readable medium storing the program according to any one of Supplementary notes 9 to 11, further causing the sound recognition apparatus to execute:

processing of specifying a type of the sound source based on a feature amount of the signal of the sound detected by the microphone.

Although the present disclosure has been described with reference to the example embodiments, the present disclosure is not limited to the above. The configuration and details of the present disclosure may be modified in various ways that would be understood by those skilled in the art within the scope of the disclosure.

INDUSTRIAL APPLICABILITY

It is possible to provide a sound recognition apparatus, a sound recognition method, and a non-transitory computer readable medium storing a program which are capable of accurately identifying similar sounds or a plurality of identical sounds and accurately estimating a sound source even when a position of a microphone is changed.

REFERENCE SIGNS LIST

1 MICROPHONE
2 ANALOG/DIGITAL CONVERTER
3 POSITION DETECTION UNIT
4 ATTITUDE DETECTION UNIT
5 SIGNAL PROCESSING UNIT
51 NOISE CANCELLATION UNIT
52 SELF-POSITION ESTIMATION UNIT
53 SOUND SOURCE ESTIMATION UNIT
54 SOUND ENVIRONMENT MAPPING UNIT
55 MAP STORAGE UNIT
56 SOUND ENVIRONMENT MAP COMPARISON UNIT
100, 100A SOUND RECOGNITION APPARATUS
200 SOUND SOURCE

What is claimed is:

1. A sound recognition apparatus comprising:
at least two microphones configured to detect a sound in a surrounding environment;
an attitude detection unit configured to detect attitudes of the microphones;
a self-position estimation unit configured to estimate positions of the microphones based on the attitudes of the microphones and a signal of the sound detected by the microphone;
a sound source estimation unit configured to estimate a direction of the sound source of the sound based on the attitudes of the microphones and the signal of the sound detected by the microphone; and
a sound environment mapping unit configured to create a sound environment map based on the positions of the microphones estimated by the self-position estimation unit and the direction of the sound source estimated by the sound source estimation unit, the sound environment map displaying at least a position of the sound source.

2. The sound recognition apparatus according to claim 1, further comprising:
a position detection unit configured to detect the positions of the microphones, wherein
the self-position estimation unit is configured to estimate the positions of the microphones based on the positions of the microphones, the attitudes of the microphones, and the signal of the sound detected by the microphone, and
the sound source estimation unit is configured to estimate the direction of the sound source based on the positions of the microphones, the attitudes of the microphones, and the signal of the sound detected by the microphone.

3. The sound recognition apparatus according to claim 1, further comprising:
a map storage unit configured to store the sound environment map created by the sound environment mapping unit; and
a sound environment map comparison unit configured to compare the sound environment map stored in the map storage unit with the sound environment map newly created by the sound environment mapping unit.

4. The sound recognition apparatus according to claim 1, wherein
the sound source estimation unit is configured to specify a type of the sound source based on a feature amount of the signal of the sound detected by the microphone.

5. A sound recognition method performed by a sound recognition apparatus comprising at least two microphones configured to detect a sound in a surrounding environment, and an attitude detection unit configured to detect attitudes of the microphones, the sound recognition method comprising:
estimating positions of the microphones based on the attitudes of the microphones and a signal of the sound detected by the microphone;
estimating a direction of the sound source of the sound based on the attitudes of the microphones and the signal of the sound detected by the microphone; and
creating a sound environment map based on the estimated positions of the microphones and the estimated direction of the sound source, the sound environment map displaying at least a position of the sound source.

6. The sound recognition method according to claim 5, wherein
the sound recognition apparatus further comprises a position detection unit configured to detect the positions of the microphones,
the sound recognition apparatus is configured to estimate the positions of the microphones based on the positions of the microphones, the attitudes of the microphones, and the signal of the sound detected by the microphone, and
the sound recognition apparatus is configured to estimate the direction of the sound source based on the positions of the microphones, the attitudes of the microphones, and the signal of the sound detected by the microphone.

7. The sound recognition method according to claim 5, wherein
the sound recognition apparatus is configured to store the sound environment map in a map storage unit, and
the sound recognition apparatus is configured to compare the sound environment map stored in the map storage unit with the newly created sound environment map.

8. The sound recognition method according to claim 5, wherein
the sound source recognition apparatus is configured to specify a type of the sound source based on a feature amount of the signal of the sound detected by the microphone.

9. A non-transitory computer readable medium storing a program for causing a sound recognition apparatus to execute:

processing of estimating positions of microphones based on attitudes of the microphones detected by an attitude detection unit and a signal of a sound in a surrounding environment detected by the microphone;

processing of estimating a direction of a sound source of the sound based on the attitudes of the microphones and the signal of the sound detected by the microphone; and processing of creating a sound environment map based on the estimated positions of the microphones and the estimated direction of the sound source, the sound environment map displaying at least a position of the sound source.

10. The non-transitory computer readable medium storing the program according to claim 9, further causing the sound recognition apparatus to execute:

processing of estimating the positions of the microphones based on the positions of the microphone detected by a position detection unit, attitudes of the microphones, and the signal of the sound detected by the microphone; and processing of estimating the direction of the sound source based on the positions of the microphones, the attitudes of the microphones, and the signal of the sound detected by the microphone.

11. The non-transitory computer readable medium storing the program according to claim 9, further causing the sound recognition apparatus to execute:

processing of storing the sound environment map in a map storage unit; and processing of comparing the sound environment map stored in the map storage unit with the newly created sound environment map.

12. The non-transitory computer readable medium storing the program according to claim 9, further causing the sound recognition apparatus to execute:

processing of specifying a type of the sound source based on a feature amount of the signal of the sound detected by the microphone.

\* \* \* \* \*